H. LEHMAN.
NUT LOCK.
APPLICATION FILED JAN. 23, 1912.

1,061,853.

Patented May 13, 1913.

Witnesses
William R. Smith.
John J. McCarthy

Inventor
Harley Lehman.
By Victor J. Evans
Attorney

UNITED STATES PATENT OFFICE.

HARLEY LEHMAN, OF OYSTERVILLE, WASHINGTON.

NUT-LOCK.

1,061,853. Specification of Letters Patent. Patented May 13, 1913.

Application filed January 23, 1912. Serial No. 672,827.

*To all whom it may concern:*

Be it known that I, HARLEY LEHMAN, a citizen of the United States of America, residing at Oysterville, in the county of Pacific and State of Washington, have invented new and useful Improvements in Nut-Locks, of which the following is a specification.

This invention relates to improvements in nut locks and has particular application to devices of this character whereby a nut may be secured to a vehicle axle against accidental displacement.

In carrying out the present invention, it is my purpose to provide a nut lock of this type which shall embody among other features a dog associated with the nut and spring actuated in one direction to securely hold the nut in its applied position, the dog being manually operable against the action of the spring to release the lock and permit the removal of the nut when such is desired.

Furthermore, I aim to provide a nut lock of this character wherein simplicity of structure, efficiency in operation, and cheapness of manufacture shall be included.

With the above and other objects in view which shall appear as the description progresses, the invention consists in the construction, combination and arrangement of parts hereinafter set forth in and falling within the scope of the appended claim.

Figure 1:
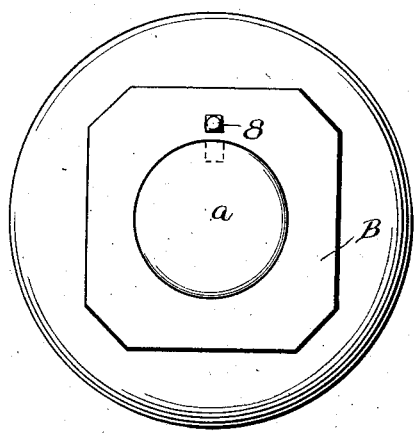
Figure 2:
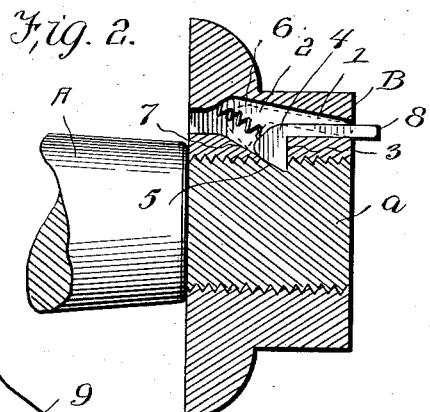
Figure 3:
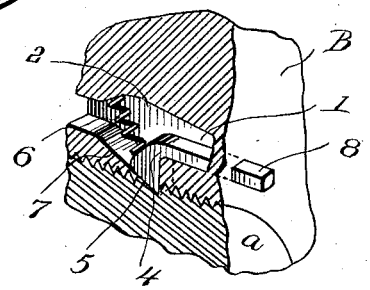
Figure 4:
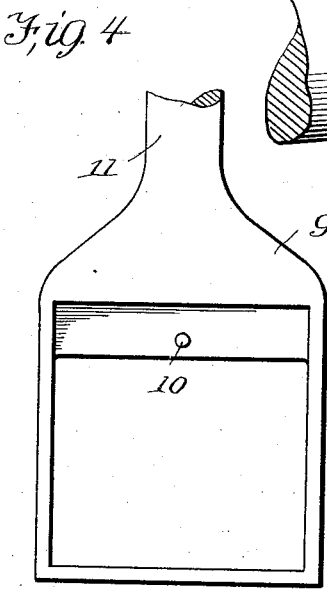

In the drawing forming a part of this specification and in which similar reference characters designate like parts throughout the several views, Figure 1 is a front elevation of a nut equipped with the present invention and applied to a vehicle axle. Fig. 2 is a central vertical sectional view of the same. Fig. 3 is a broken perspective view of a nut showing the normal position of the dog upon the inner surface thereof, and Fig. 4 is a detail side elevation of a wrench used for unlocking and removing the nut.

Referring to the accompanying drawing in detail, A designates a vehicle axle having the usual reduced threaded extremity *a* for the purpose of receiving a nut B to retain the vehicle wheel (not shown) on the axle. The nut B, in the present instance, is provided with a longitudinal bore 1 opening on to the outer face of the nut and terminating at its inner end in a chamber 2 and an opening 3 which latter opens on to the inner threaded bore of the nut, the chamber 2 having communication with the inner surface of the nut. Aside from these changes, the nut may be of any suitable or preferred configuration but in the present embodiment of the invention is shown to be four sided or square so as to facilitate the application of a wrench.

Mounted within the chamber 2 is a locking dog 4 of substantially triangular shape and having one of its edges normally projecting through the opening 3 and into engagement with a cut out portion 5 of the reduced extremity of the vehicle axle A so that accidental displacement of the nut is eliminated. Normally holding the locking dog in this position is a coiled extensile spring 6 interposed between the upper surface of the dog and one of the walls of the chamber 2 so that the dog is normally projected through the opening 3 in the threaded bore of the nut. The chamber 2 has its lower wall beveled as at 7 to permit movement of the locking dog against the action of the spring 6, and to impart such movement to the dog, the latter is provided with a stem 8 arranged within the bore 1 of the nut and projecting outwardly thereof in the position of the locking dog. Thus, when it is desired to remove the locking dog from engagement with the reduced extremity of the axle, the stem 8 may be forced inwardly thereby disengaging the dog from the reduced extremity of the axle against the action of the extensile spring 6 so that removal of the nut is permitted. To effect this disengagement of the locking dog from the reduced extremity of the axle and also apply a turning movement to the nut so that the latter may be removed I have devised a peculiar form of wrench which in the present instance embodies what may be termed a holder 9 of a shape coincident with the shape of the nut and equipped with a pin 10 arranged out of the plane of the holder and designed to engage the stem 8 of the locking dog in the application of the wrench to the nut, the pin being designed to disengage the locking dog just previous to the holder reaching the limit of its movement when the same is being applied to the nut. This holder is provided with a suitable handle 11 to permit convenient rotation of the nut.

To apply the nut to the axle, the stem 8 is pressed inwardly of the nut thus moving the locking dog out of the threaded bore of the nut so that by turning the said nut upon the threaded extension of the axle, the former may be threadedly engaged with the axle as usual. Subsequent to the threading of the nut on to the axle, the stem 8 of the locking dog may be released to permit the spring 6 to actuate the locking dog to move the same into the cut out portion 5 of the vehicle axle thereby securely fastening the nut to the axle against accidental displacement.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described my invention, what I claim and desire to secure by Letters-Patent is:

In a nut lock, a nut provided with a chamber having a relatively inclined wall and in communication with the threaded bore of the nut at one extremity of said inclined wall, a locking dog mounted within the chamber and slidable on the inclined wall thereof, a spring within the chamber and normally holding said locking dog within the threaded bore of the nut, and a stem carried by said locking dog and projecting outwardly of the nut and adapted to move the locking dog out of the threaded bore of the nut over the inclined wall of the chamber and against the action of the spring.

In testimony whereof I affix my signature in presence of two witnesses.

HARLEY LEHMAN.

Witnesses:
 M. A. SARGANT,
 F. L. SARGANT.

Copies of this patent may be obtained for five cents each, by addressing the "Commissioner of Patents, Washington, D. C."